March 22, 1938.  H. D. HARPER  2,112,156
APPARATUS FOR MAKING INFUSIONS OF COFFEE AND OTHER MATERIAL
Filed Sept. 10, 1934  3 Sheets-Sheet 1
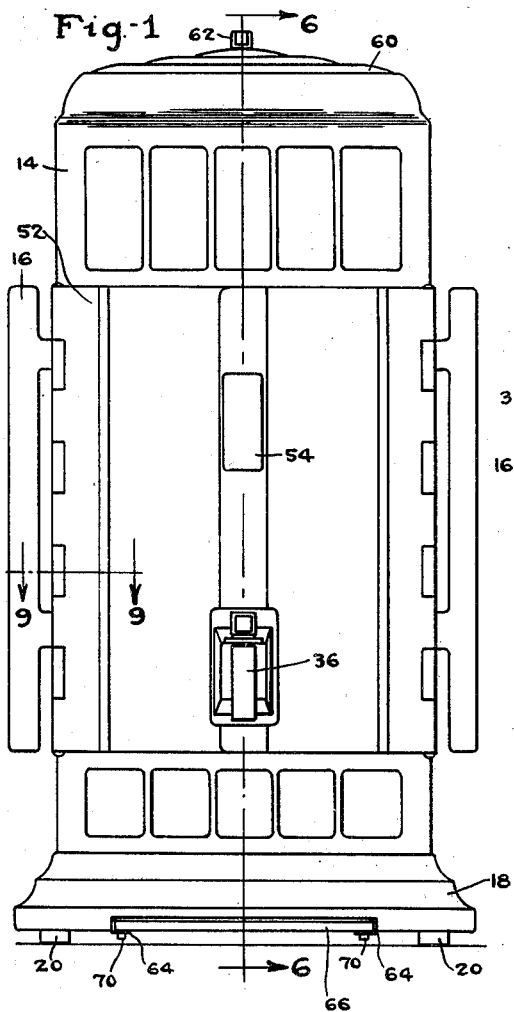
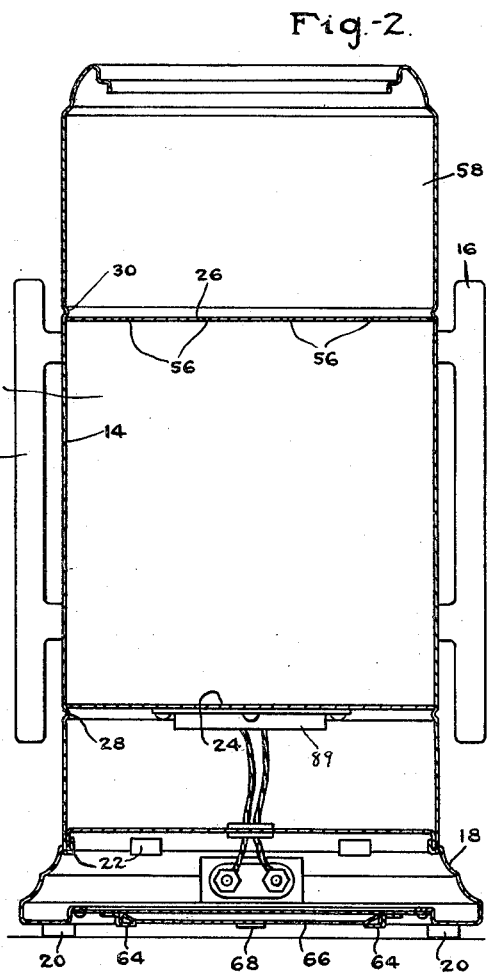
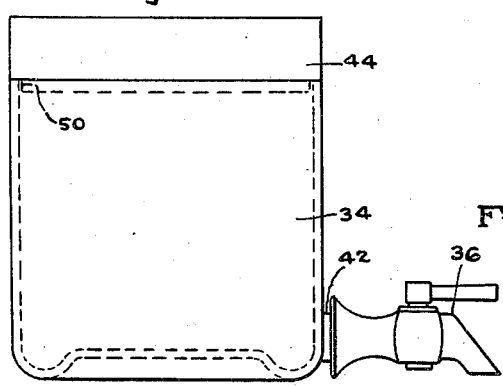
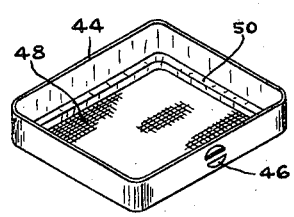
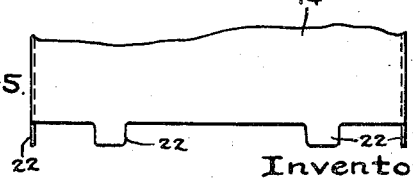
Inventor:
Harry Dorr Harper.
By Whiteley and Ruckman
Attorneys.

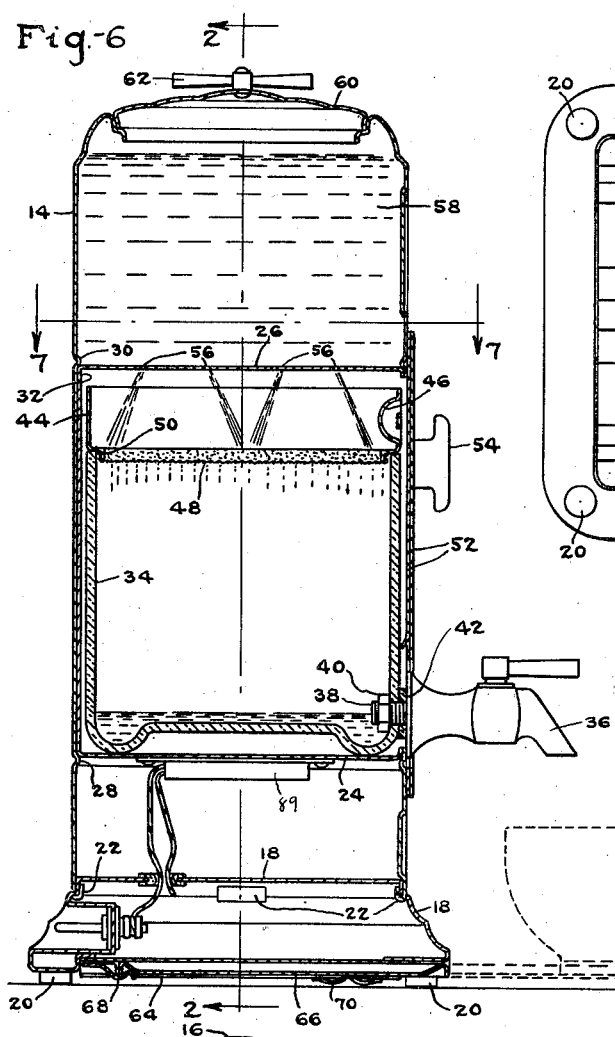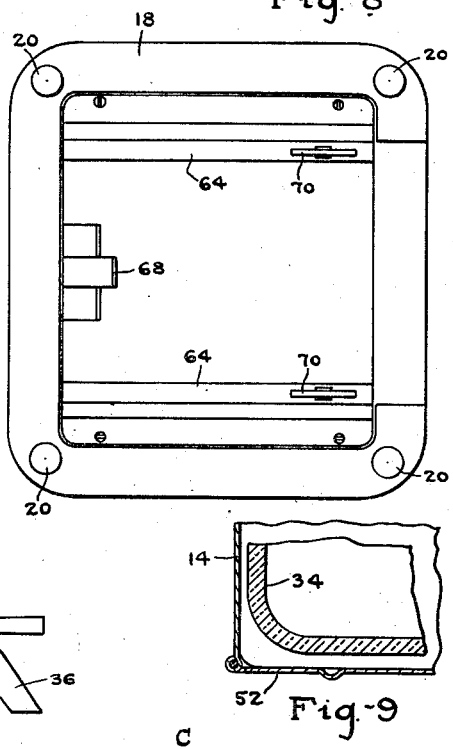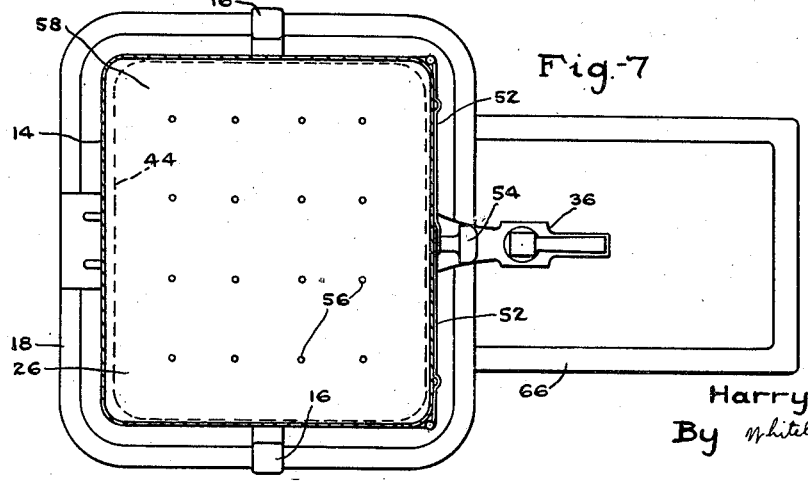

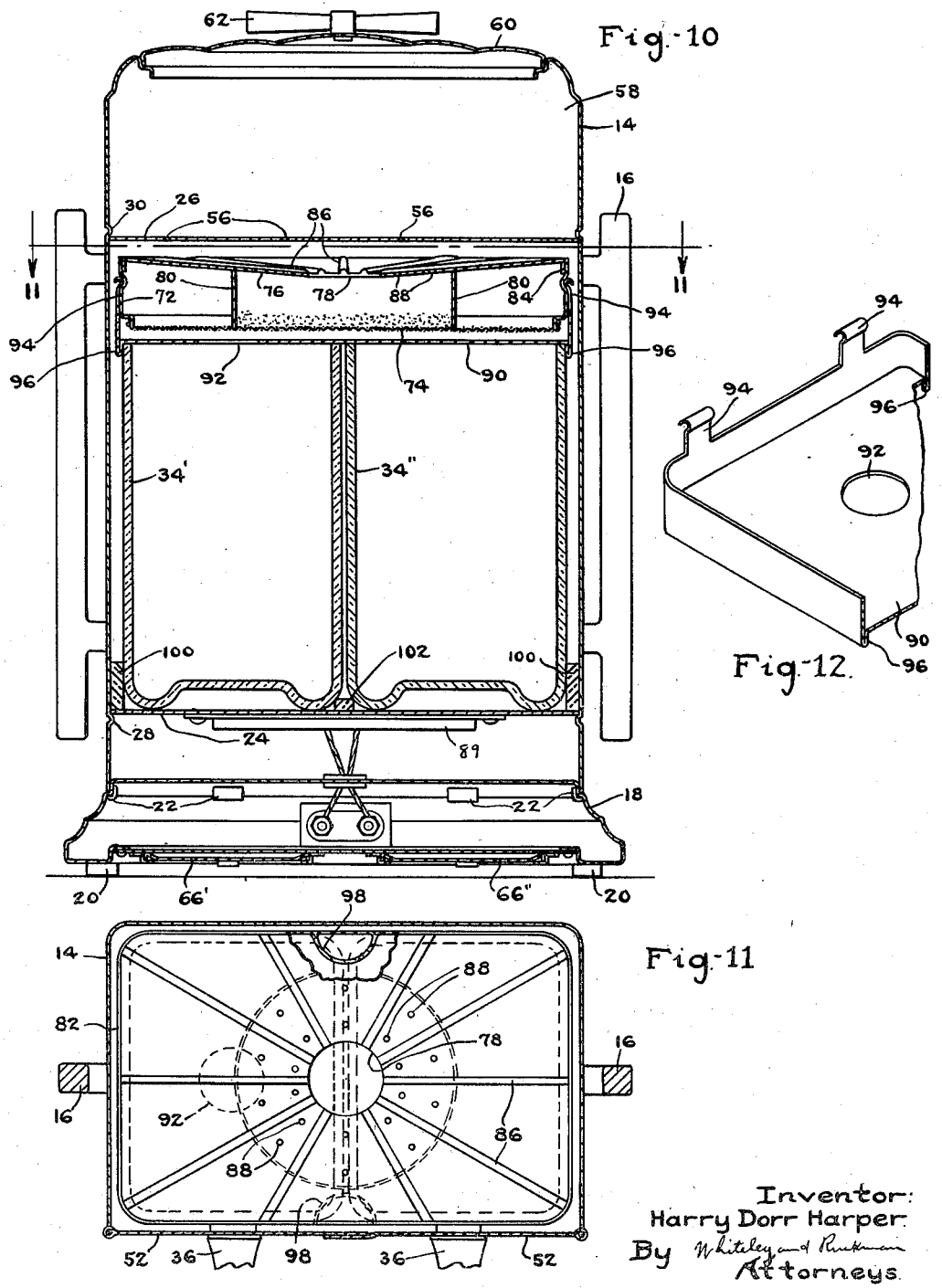

Patented Mar. 22, 1938

2,112,156

UNITED STATES PATENT OFFICE 2,112,156

APPARATUS FOR MAKING INFUSIONS OF COFFEE AND OTHER MATERIAL

Harry Dorr Harper, Minneapolis, Minn., assignor, by mesne assignments, to First National Bank and Trust Company of Minneapolis, Minneapolis, Minn., as trustee Application September 10, 1934, Serial No. 743,426

6 Claims. (Cl. 53—3)

My invention relates to apparatus for making infusions of coffee and other material. Among the objects of the invention are the provision of apparatus of this character which is of compact arrangement and which is economical in manufacture so that it is particularly adapted for domestic or household use.

Another object is to provide an apparatus containing two infusion receiving bowls and one basket for the material to be infused, the arrangement being such that the basket may be caused to discharge the infusion to either one of the bowls individually. This arrangement permits the withdrawal of finished infusion from either one of the bowls while the infusion being prepared is received in the other bowl.

While intended more particularly for making coffee infusions, it is to be understood that my apparatus is well adapted for making infusions of other materials, as for instance tea infusions, beef tea extract, and extracts of various herbs used for beverage, medicinal or other purposes. It will also be understood that while I have in mind the use of hot water as the infusing liquid for coffee and tea, other infusing liquids may be used according to the infusion which it is desired to prepare.

Referring more particularly to coffee, among the important points to be observed for making good coffee are, water at the proper temperature, short contact of water with the ground coffee, and absence of corroding metals in the receptacle into which the infusion is delivered. Actual boiling imparts a bitter taste to the coffee. But at temperature of water of from 185° F. to 203° F., the caffein is nearly all dissolved, the flavor-giving oils or ethers are not so largely boiled off and certain changes resulting in bitterness and woody taste are absent or practically negligible. Long infusion, even at the lower temperatures increases the bitter taste and decreases the flavor and aroma, while coffee boiled for even one minute is much more bitter than that prepared by infusion at 203° F. Therefore, brief treatment followed by immediate filtration or separation from the ground coffee is desirable. Furthermore, certain metals give an objectionable taste to the coffee infusion while vitrified wares such as glass and porcelain have no deleterious effect on the taste of the infusion.

In view of the foregoing, it will be understood that further objects of my invention are to provide for use of an infusing liquid at the most advantageous temperature, to provide for short contact only of the infusing liquid with the material to be infused, and to provide a receiving bowl for the infusion made of material such as pyrex having no injurious effect on the infusion.

The novel features which I believe to be characteristic of my invention are set forth with particularity in the appended claims. The invention, however, both as to its organization and method of operation, together with additional objects and advantages thereof will be best understood from the following description of specific embodiments when read in connection with the accompanying drawings, in which Fig. 1 is a front elevational view of the apparatus. Fig. 2 is a view in central vertical on the line 2—2 of Fig. 6; but with the cover, basket and bowl removed. Fig. 3 is a side elevational view of the basket and bowl. Fig. 4 is a perspective view of the basket. Fig. 5 is a detail view showing the lower edge of the casing. Fig. 6 is a view in section on the line 6—6 of Fig. 1 and showing the parts completely assembled. Fig. 7 is a view in section on the line 7—7 of Fig. 6 with the tray pulled out. Fig. 8 is a bottom plan view with the tray removed. Fig. 9 is a fragmentary view in section on the line 9—9 of Fig. 1. Fig. 10 is a sectional view corresponding to Fig. 2, but showing a modified form in which two bowls are used in association with one basket. Fig. 11 is a view in section on the line 11—11 of Fig. 10. Fig. 12 is a fragmentary view showing a basket support used in this form of the invention.

Referring to the particular construction shown in the drawings for illustrative purposes, it will be seen that I provide a casing 14 to opposite sides of which handles 16 are attached and which is supported on a base 18 having feet 20 adapted to rest upon any suitable surface. The casing 14 is secured to the base 18 by several lugs 22 formed on the lower edge of the casing as shown in Fig. 5, these lugs being passed through openings in the upper portion of the base and then turned upwardly as shown in Figs. 2 and 6. The casing is provided with a lower partition 24 and an upper partition 26 which may be secured in place in any suitable manner. As shown in Fig. 6, the partition 24 fits upon a bead 28 struck inwardly from the material of the casing while partition 26 fits underneath a similar bead 30, the partitions being integral with the connecting member 32.

In the form shown in Fig. 6, a single receiving bowl 34 rests upon the partition 24, while in the form shown in Fig. 10, two receiving bowls 34' and 34'' rest upon the partition. The bowls are made of vitreous material such as pyrex and each bowl is provided with a faucet 36 secured thereto in liquid tight manner. As shown in Fig. 6, the faucet carries a hollow externally threaded stem 38 passing through an opening near the bottom of the bowl and secured by a nut 40 with a gasket 42 interposed between the exterior of the bowl and the body of the faucet.

A basket 44 for the material to be infused is adapted to rest upon the bowl 34, the side of the basket having a re-entrant portion 46 by means of which the basket may be lifted. The construction of the basket is best shown in Fig. 4 in which it will be seen that the basket has a bottom 48 formed of fine mesh screen or otherwise provided with fine perforations. The lower edge of the basket is rabbeted at 50 to fit inside of the top of the bowl 34 whereby the basket and bowl may be handled as a unit as will be understood from Fig. 3. In order that they may be withdrawn laterally from the casing 14, the latter is provided with doors 52 which may be opened by means of a handle 54, the doors of course being cut sufficiently to move past the faucet 36. Upon opening the doors, it is obvious that the basket when lifted may be removed separately and that the basket and bowl may be removed as a unit without first lifting the basket.

The partition 26 contains perforations 56 which are preferably inclined for a purpose which will presently appear. Above the partition, the casing contains a chamber 58 closed by a cover 60 provided with a handle 62 for lifting the latter. The chamber 58 is supplied with infusing liquid in any suitable manner as for example the manner disclosed in my copending application Serial Number 743,427 which matured into Patent Number 2,067,918 dated January 19, 1937. The inclination of the perforations 58 causes the infusing liquid to be better distributed over the material in the basket.

The base 18 carries two slideways 64 suitably spaced from each other and which slidably support a tray 66 as will be best understood by referring to Fig. 2. By referring to Figs. 6 and 8, it will be seen that the base 18 carries a stop catch device embodying a resilient finger 68 adapted to snap into engagement with the rear lower edge of the tray and thereby retain the latter in retracted position within the base. When some of the infusion in the bowl 34 is to be drawn off, the tray 66 is first pulled out into the dotted line position shown in Fig. 6 and a suitable receptacle such as a coffee cup C is placed on the tray underneath the faucet. Upon now opening the faucet, the receptacle C may be filled and then removed after the faucet has been closed. The tray therefore serves not only as a support for the receptacle which is to be filled but also catches any drip. In order to retain the tray in its extended position, the slideways 64 are provided with stop catch devices embodying resilient fingers 70 adapted to engage the rear lower edge of the tray when the latter is pulled out into the dotted line position of Fig. 6.

As previously indicated, Figs. 10, 11, and 12 show a modified form of the invention in which two bowls 34' and 34" are placed side by side so that the finished infusion may be withdrawn from either bowl while the infusion being prepared is received in the other bowl. In order to accomplish this result, the basket device shown in Fig. 10 is used. This device includes the basket device 72 having a perforated bottom 74 such as previously described. Instead of resting directly upon the infusion receiving bowl, the basket in this form of invention is provided with the support best shown in Fig. 12. This support comprises a pan having a bottom 90 provided with a hole 92 located considerably nearer one side of the pan than it is to the opposite side. Extending up from the side walls of the pan are lugs 94 whose upper ends are beaded so as to fit into depressions formed in the basket member 72 whereby the support may be clipped to the basket. The walls of the support are shown extended below the bottom 90 to form a peripheral downwardly extending flange 96 adapted to fit over the two bowls 34' and 34" when they are placed side by side in the casing as shown in Fig. 10. When the basket support is in this position, it is evident that the hole 92 is located centrally over the bowl 34' so that the infusion from the receptacle 72 will be delivered to this bowl only. Finished infusion may at this time be drawn from the bowl 34". When the infusion in the bowl 34' is finished, the doors 52 may be opened and the support carrying the basket reversed in position to bring the hole 92 directly above the bowl 34" so that the infusion being prepared will now be delivered into this bowl while the finished infusion may be drawn from the bowl 34'. In order to facilitate lifting the receptacle 72 and its support to effect the reversal referred to, the receptacle is provided with re-entrant portions 98 for grasping.

The construction just described serves for making a large quantity of the infusion. In order that a small quantity of the infusion may be conveniently made, I prefer to provide a cover plate 76 containing a hole 78 centrally located. This plate carries a depending ring 80 concentrically disposed around the hole 78 and which extends down to the perforated bottom 74 when the cover plate is in position on the receptacle 72. The cover plate 76 has a down-turned peripheral flange 84 adapted to fit inside of the upper portion of the receptacle 72. The cover plate is concaved with the hole 78 at the lowest portion thereof and the upper surface of the plate is provided with ribs 86 which radiate from the hole 78 as shown in Fig. 11, and the portion of the plate within the limits of the ring 80 is provided with perforations 88 which are preferably inclined so that the infusing liquid will be well distributed. When the cover plate is used for small quantities, it will be understood that the material to be infused is placed only inside of the ring 80 as shown in Fig. 10. As shown in Figs. 2, 6, and 10, an electrical heating element 89 may be attached to the lower side of the partition 24 for the purpose of keeping hot the infusion in the bowl 34 or the bowls 34' and 34" when two bowls are used.

As shown in Fig. 10, the two bowls may be kept in proper position in the casing by means of strips 100 placed between the casing and the walls of the bowls which are adjacent thereto, and a strip 102 extending between the two bowls. These strips rest on the partition 24 and may be made of insulating material. Separate trays 66 and 66" are provided for the two bowls 34' and 34". These trays are similar to the tray 66 previously described in detail and hence further description thereof is unnecessary.

The operation and advantages of my invention will be apparent in connection with the foregoing description and the accompanying drawings. Ground coffee or other material is placed in the basket and the infusing liquid is delivered in the form of a spray upon this material and percolates therethrough so as to take up the constituents which are to be embodied in the infusion. The liquid thus obtained drips through the screen bottom of the basket and into the bowl from which it may be drawn from time to time as desired. Ordinarily the screen bottom will be sufficiently fine to prevent undesirable sediment getting through. In other words a screen filter is provided. In case it is desired to obtain a finer degree of filtration, it is obvious that a filter paper or cloth may be placed in the bottom of the basket in advance of the charge of material which is to be infused. The apparatus having one bowl is usually sufficient to supply the ordinary family with the desired quantity of coffee or other beverage made by infusion. For larger families or for parties, the apparatus having two bowls may be used. After the infusion in one bowl is finished, the basket is removed from the casing in the manner previously described, the grounds dumped, a fresh charge added, and the basket replaced in reversed position in the casing. The second bowl is now utilized for preparing additional infusion while finished infusion is being drawn from the first bowl. These operations may be performed in alternation for the two bowls as long as desired.

I claim:

1. In apparatus for making infusions of coffee and other material, the combination of a casing, means in the upper portion of said casing for delivering an infusing liquid, a filtration receptacle for holding the material to be infused and adapted to receive said infusing liquid, two bowls underneath said receptacle, and a plate between said receptacle and said bowls, said plate containing an off-center opening whereby change in the position of the plate causes the infusion from said receptacle to be received in one or the other of said bowls.

2. In apparatus for making infusions of coffee and other material, the combination of a casing, means in the upper portion of said casing for delivering an infusing liquid, a filtration receptacle for holding the material to be infused and adapted to receive said infusing liquid, a pan which supports said receptacle above the bottom of the pan, and two bowls over which the bottom of said pan extends, said bottom containing an off-center opening whereby change in the position of said bottom causes the infusion from said receptacle to be received in one or the other of said bowls.

3. In apparatus for making infusions of coffee and other material, the combination of a casing, a horizontal partition in the upper portion of said casing constituting the bottom of a chamber for an infusing liquid, said bottom containing perforations, a filtration receptacle for holding the material to be infused underneath said bottom, a concaved open center cover plate for said receptacle, ribs on the upper surface of said plate radiating from said open center and means for receiving the infusion from said receptacle.

4. In a device of the kind described, a casing, vertical walls defining a plurality of separate open-topped compartments within said casing, means for withdrawing brewed coffee from each compartment, a coffee brew making compartment arranged above the compartments, the coffee brew making compartment having a flat bottom provided with a delivery opening at one side adapted to be selectively arranged over either of the open-topped compartments, said flat bottom contacting the vertical walls of said compartments and interrupting communication therebetween.

5. In apparatus for making infusions of coffee and other material, the combination of a casing, a plurality of separate compartments within said casing, a filtration receptacle for holding the material to be infused arranged above said compartments, and a plate between said receptacle and compartments, said plate being provided with a delivery opening toward one side thereof adapted to be selectively arranged over any one of the separate compartments, said plate contacting the tops of said separate compartments and interrupting communication therebetween.

6. In apparatus for making infusions of coffee and other material, the combination of a casing, a plurality of separate compartments within said casing, a filtration receptacle for holding the material to be infused arranged above said compartments, and means between said receptacle and compartments for causing the infusion from said receptacle to be selectively delivered into any one of the separate compartments, said means contacting the tops of said separate compartments and interrupting communication therebetween.

HARRY DORR HARPER.